United States Patent [19]

Okada

[11] Patent Number: 4,475,508
[45] Date of Patent: Oct. 9, 1984

[54] AUTOMOTIVE ENGINE CYLINDER BLOCK

[75] Inventor: Makoto Okada, Tokyo, Japan

[73] Assignee: Nissan Motor Company, Limited, Yokohama, Japan

[21] Appl. No.: 446,675

[22] Filed: Dec. 3, 1982

[30] Foreign Application Priority Data

Dec. 10, 1981 [JP] Japan .................. 56-199044

[51] Int. Cl.³ .................. F02B 5/04; F02B 33/00
[52] U.S. Cl. .................. 123/425; 123/435; 73/35
[58] Field of Search ............. 123/425, 435; 73/35

[56] References Cited

U.S. PATENT DOCUMENTS

| 1,347,476 | 7/1920 | Allyne | 73/35 |
| 3,247,705 | 7/1961 | Wostl | 73/35 |
| 4,066,057 | 1/1978 | Hale | 123/41.72 |
| 4,225,802 | 9/1980 | Suzuki et al. | 73/35 |
| 4,289,102 | 9/1981 | Matsumata | 73/35 |
| 4,312,214 | 1/1982 | Kramer . | |

FOREIGN PATENT DOCUMENTS

| 1146701 | 4/1963 | Fed. Rep. of Germany | 73/35 |
| 2716712 | 10/1978 | Fed. Rep. of Germany | 73/35 |
| 54-113378 | 9/1979 | Japan | 73/35 |

Primary Examiner—Ronald B. Cox
Attorney, Agent, or Firm—Schwartz, Jeffery, Schwaab, Mack, Blumenthal & Koch

[57] ABSTRACT

A cylinder block of an automotive engine comprises a cylinder wall section defining an engine cylinder and connected to a cylinder block skirt section. A water jacket outer wall section is connected to the cylinder wall section and located separate from the skirt section at a portion integral with the cylinder wall section, so that a lower part of the cylinder wall section between the water jacket outer wall section and the skirt section is exposed to ambient air. Additionally, the lower part of the cylinder wall section is integrally formed at its outer surface with a boss section to which an engine knock sensor is secured. Accordingly, engine knock is effectively transmitted to the engine knock sensor, thereby improving the sensing accuracy of the engine knock sensor.

6 Claims, 2 Drawing Figures

AUTOMOTIVE ENGINE CYLINDER BLOCK

BACKGROUND OF THE INVENTION

1. Field of the Invention

This invention relates to an improvement in a cylinder block of an automotive internal combustion engine, equipped with an engine knock sensor.

2. Description of the Prior Art

It is well known that knocking preventing devices have been already put into practical use, for example, in high compression ratio engines and engines equipped with a supercharger. Such knocking preventing devices are arranged to detect engine knock generation by sensing the vibration of a cylinder block, and suppress the engine knock, for example, by retarding spark timing in response to the detected engine knock generation. However, this engine knock sensor is usually located on a water jacket outer wall section defining thereinside a water jacket, and therefore engine knock generated in an engine cylinder is subjected to damping action by the water jacket, thus deteriorating the sensing accuracy of the engine knock sensor.

SUMMARY OF THE INVENTION

A cylinder block of an automotive internal combustion engine, according to the present invention comprises a cylinder wall section defining an engine cylinder and connected to a cylinder block skirt section. A water jacket outer wall section is connected to the skirt section and located separate from the skirt section at a portion integral with the cylinder wall section, so that a lower part of the cylinder wall section between the water jacket outer wall section and the skirt section is exposed to ambient air. Additionally, a boss section for an engine knock sensor is integrally formed on the outer surface of the cylinder wall section at the exposed part. Accordingly, engine knock generated in the engine cylinder is effectively transmitted to the engine knock sensor through the cylinder wall section lower part and the boss section, without being subjected to vibration damping action by the water jacket. This greatly improves the sensing accuracy of the engine knock sensor, particularly in case the engine knock is generated in an engine cylinder located far from the engine knock sensor.

BRIEF DESCRIPTION OF THE DRAWINGS

The features and advantages of the cylinder block according to the present invention will be more clearly appreciated from the following description taken in conjunction with the accompanying drawing, in which.

DETAILED DESCRIPTION OF THE INVENTION

Figure 1:
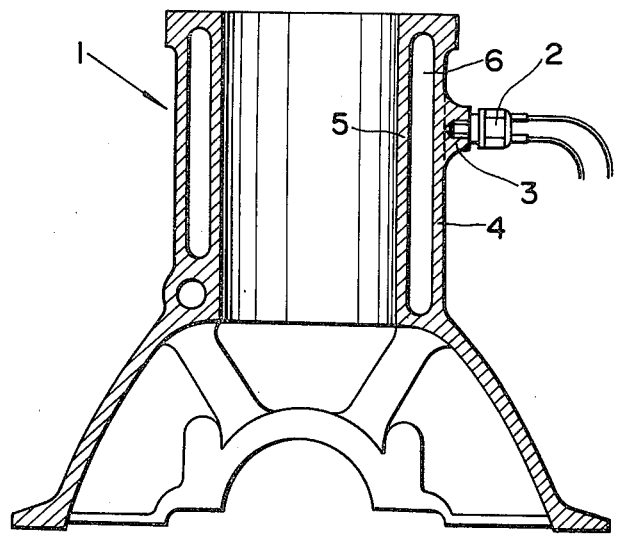
FIG. 1 is a vertical sectional view of a conventional cylinder block of an automotive internal combustion engine.

Referring to FIG. 1, a conventional cylinder block 1 of an automotive internal combustion engine will be described along with its major shortcomings. The cylinder block 1 is, in case of multi-cylinder type, equipped with one or a plurality of engine knock sensors 2 which form part of an engine knock preventing system. The engine knock sensor 2 is usually installed in a boss section 3 integrally formed at the upper part of a water jacket outer wall section 4.

However, difficulties have been encountered with such a conventional cylinder block in which engine knock generated at a cylinder wall section 5 is largely damped by cooling water in a water jacket 6 formed between the cylinder wall section 5 and the water jacket outer wall section 4. This engine knock damping tendency is conspicuous particularly during transmission of engine knock from the cooling water to the water jacket outer wall section 4. As a result, engine knock cannot be correctly and accurately detected, particularly in case engine knock is generated in an engine cylinder located far from the boss section 3 for the engine knock sensor (26).

Figure 2:
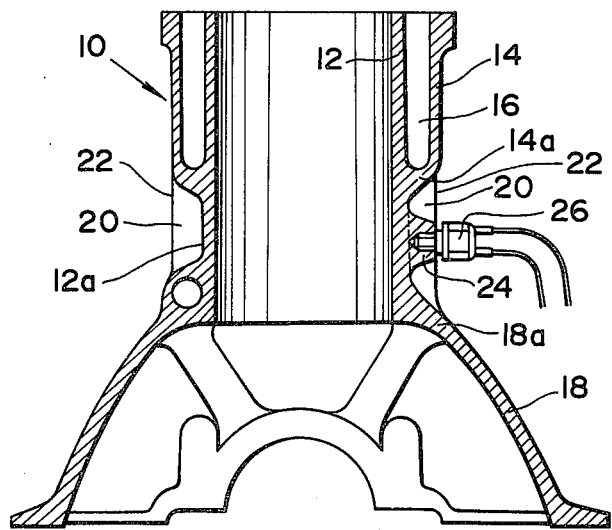
FIG. 2 is a vertical sectional view of a preferred embodiment of a cylinder block of an automotive internal combustion engine in accordance with the present invention.

In view of the above description of the conventional cylinder block structure, reference is now made to FIG. 2, wherein a preferred embodiment of a cylinder block of the present invention is illustrated by the reference numeral 10. The cylinder block 10 is, in this case, of an automotive internal combustion engine and comprises one or a plurality of cylinder wall sections 12 each defining therein an engine cylinder (no numeral). The cylinder wall sections 12 are surrounded by a water jacket outer wall section, forming therebetween a water jacket 16 through which cooling water flows. In this embodiment, the water jacket 16 is formed relatively shallow so that the bottom portion of the water jacket 16 is located in the vicinity of the crown of a piston (not shown) at bottom dead center. Accordingly, the lower end part 14a of the water jacket outer wall section 14 is spaced away from a cylinder block skirt section 18 which is integral with the bottom part of the cylinder wall sections 12 and bulges outwardly to define thereinside an upper part of a crankcase. As shown, the water jacket outer wall section 14 is integral at its lower end portion 14a with the cylinder wall section 12. Accordingly, a depressions 20 is formed between the lower end portion 14a of the water jacket outer wall section 14 and the upper end portion 18a of the skirt section 18, thereby exposing the outer surface of a lower part 12a of the cylinder wall section 12 to ambient air. The depression 20 extends continuously along all the cylinder wall sections 12 or all the engine cylinders. In other words, the exposed lower parts 12a of respective cylinder wall sections 12 are integral with each other. The reference numeral 22 denotes vertical ribs for integrally interconnecting the water jacket outer wall section 14 and the cylinder block skirt section 18. Each vertical rib 22 is integral at a section located between the neighbouring engine cylinders.

It will be understood that although the water jacket 16 is not formed around the cylinder wall section lower part, there arises no problem from the viewpoint of engine cooling performance because the cylinder wall section lower part 12a is low in thermal load. In this connection, if the cylinder block 10 is formed of aluminum alloy, it is not necessary to have so deep of a water jacket because of the high thermal conductivity of the aluminum alloy. In case of the cylinder block formed of aluminum alloy, it is usual to produce the cylinder block by means of aluminum die casting, so that the cylinder wall section 12 and the water jacket outer wall section 14 are not interconnected at the upper end part of the cylinder block 10, thereby forming a cylinder block of the type wherein a so-called upper block deck is omitted. In this case, it is desirable that the water jacket 16 be as shallow as possible from the viewpoint of facilitating casting and improving casting accuracy.

Additionally, a boss section 24 is integrally formed on the outer surface of the cylinder wall section 12 which forms the bottom part of the depression 20. In other words, the boss section 24 is integrally formed on the outer surface of the exposed lower part 12a of the cylinder wall section 12 which lower part is located between the lower end portion 14a of the water jacket outer wall section 14 and the upper end portion 18a of the cylinder block skirt section 18. An engine knock sensor 26 is secured to the boss section 24 in a manner that a projection (no numeral) thereof is threaded into the boss section 24. The engine knock sensor 26 is of the known magnetic stress type or piezoelectric type and is arranged to convert vibration due to engine knock to an electric signal. While only one boss section 24 provided with the engine knock sensor 26 has been shown and described to be used for all engine cylinders, it will be understood that a plurality of boss sections 24 each provided with an engine knock sensor 26 may be used for all the engine cylinders.

With the thus arranged cylinder block, engine knock generated at the upper part of the cylinder wall section 12 is transmitted to the engine knock sensor 26 through the cylinder wall section lower part 12a and the boss section 24, without being subjected to any vibration damping action of the water jacket 16. It is to be noted that even if engine knock is generated in an engine cylinder located far from the engine knock sensor 26, vibration due to the engine knock is effectively transmitted to the engine knock sensor 26 through the respective cylinder wall lower parts 12a which are continuously integral with each other.

As will be appreciated from the above, according to the automotive engine cylinder block of the present invention, vibration due to engine knock is directly transmitted to the engine knock sensor without being damped by the water jacket, thereby greatly improving the sensing accuracy of the engine knock sensor. Besides, it becomes possible to certainly detect engine knock generated even in an engine cylinder located far from the engine knock sensor 26.

What is claimed is:

1. A cylinder block of an automotive internal combustion engine,
   said cylinder block being formed of aluminum alloy and comprising:
   a cylinder wall section defining an engine cylinder and connected to a skirt section of the cylinder block;
   a water jacket outer wall section connected to said cylinder wall section and located separate from said skirt section at a portion integral with said cylinder wall section, a water jacket being formed between said water jacket outer wall section and said cylinder wall section so as to be completely open through the top surface of the cylinder block, a lower part of said cylinder wall section between said water jacket outer wall section and said skirt section being exposed to ambient air; and
   a boss section to which an engine knock sensor is secured, said boss section being integrally formed at the outer surface of said cylinder wall section at said exposed lower part.

2. A cylinder block as claimed in claim 1, further comprising means defining a depression located between the lower end portion of said water jacket outer wall section and the upper end portion of said skirt section, said water jacket outer wall section being integral at the lower end portion with said cylinder wall section while said skirt section being integral at the upper end portion with said cylinder wall section.

3. A cylinder block as claimed in claim 2, further comprising a rib section integrally interconnecting said water jacket outer wall section at the lower end portion and said skirt section at the upper end portion.

4. A cylinder block as claimed in claim 3, wherein water jacket is so located that its bottom part is positioned on the upper side of the lower end portion of said water jacket outer wall section.

5. A cylinder block as claimed in claim 2, further comprising at least a cylinder wall section defining at least an engine cylinder and connected to said cylinder block skirt section, in which said lower parts of respective cylinder wall sections are integrally connected with each other.

6. A cylinder block as claimed in claim 5, wherein said depression extends generally horizontally along said lower parts of respective cylinder wall sections.

* * * * *